United States Patent [19]
Koch

[11] 3,958,964
[45] May 25, 1976

[54] APPARATUS FOR BRINGING GASES AND LIQUIDS INTO CONTACT

[75] Inventor: Christian Koch, Nurnberg-Grossgrundlach, Germany

[73] Assignee: Siemens Aktiengesellschaft, Munich, Germany

[22] Filed: Feb. 6, 1974

[21] Appl. No.: 439,882

[30] Foreign Application Priority Data
Feb. 7, 1973 Germany............................ 2306008

[52] U.S. Cl.............................. 55/186; 23/270.5 R; 210/21; 261/114 TC
[51] Int. Cl.².......................................... B01D 3/18
[58] Field of Search ................. 210/21, 23; 55/186, 55/54; 23/270.5 R, 270.5 T; 261/114, 96

[56] References Cited
UNITED STATES PATENTS

| | | | |
|---|---|---|---|
| 2,020,009 | 11/1935 | Zeitler............................ | 23/270.5 R |
| 2,143,015 | 1/1939 | Kleinschmidt....................... | 261/96 |
| 2,717,854 | 9/1955 | Felix............................ | 23/270.5 T X |
| 2,737,377 | 3/1956 | Huggins et al................. | 261/114 R |
| 3,103,545 | 9/1963 | Korelitz......................... | 23/270.5 X |
| 3,105,105 | 9/1963 | Kittel........................... | 261/114 R X |
| 3,712,595 | 1/1973 | Hirsch............................. | 261/96 X |

*Primary Examiner*—Frank A. Spear, Jr.
*Attorney, Agent, or Firm*—Kenyon & Kenyon Reilly Carr & Chapin

[57] ABSTRACT

The invention concerns a column for bringing gases or vapors and liquids into contact which uses a plurality of plates made from a highly porous, open-pore, sintered material. According to the invention, the gas and the liquid are conducted in this column counter-current-wise; the column plates are equipped with run-off tubes which have at the lower end a gas shut-off device such that upon starting, the path for the gas is blocked by the gas shut-off device because of the liquid column contained therein. This liquid column exerts on the gas a larger pressure than corresponds to the pressure difference between the gas in the space under the associated column plate and that above. The run-off tube is of such size that it is only partly filled by the liquid column so that it can continuously adjust itself during operation. The actual reaction between the gas and the liquid takes place partially within the column plates resulting in a greater exchange between the liquid and the gas and making the column relatively insensitive to motion effects and load variations.

5 Claims, 3 Drawing Figures

APPARATUS FOR BRINGING GASES AND LIQUIDS INTO CONTACT

BACKGROUND OF THE INVENTION

1. Field of the Invention

The invention concerns an apparatus for the absorption and/or desorption of gases by liquids and particularly one wherein the gas and liquid pass in opposite directions to each other.

2. Description of the Prior Art

Filling-material columns or conventional plate columns such as bell, screen or valve-plate columns are frequently used as devices for the absorption of gases by liquids or for the desorption of gases from liquids. These devices, however, do not always work satisfactorily, and for some applications are completely unsuitable. For example because of their sensitivity to an inclined position these systems do not work well when in motion. This is particularly the case in purification equipment wherein gaseous reactants, which are used in the generation of energy in fuel cell batteries in the field of electric traction are generated. Further, filling-material columns and the conventional plate columns are often unsuitable where the impurities are to be removed from small quantities of raw gas.

Columns with plates of highly porous, open-pore, sintered material such as sintered magnesium aluminum silicate, having passage openings therethrough, are already in use. However, present configurations are arranged such that the gas and liquid are conducted in the same direction, i.e., from the sump to the head of the column. A description of how the absorption or desorption takes place in these type columns may be found in German Auslegeschrift No. 1,808,623.

It is an object of this invention, therefore, to provide an improved column of the type which employs the, open-pore, sintered material, wherein the amount of absorption and desorption is increased.

It is an object of this invention to provide a column wherein the gas and liquid flow countercurrent to each other.

It is a further object, that the column of this invention be relatively insensitive to the effects of motion and load variations.

SUMMARY OF THE INVENTION

The column described in this invention is designed so that the gas and the liquid are conducted therethrough in opposite or countercurrent directions. The plates in the column fabricated from an open-pore, sintered material are provided with run-off tubes which extend above and below the particular column plate. The run-off tubes are provided with a gas shut-off device located at its lower end. The gas shut-off device includes at least one outlet opening, which permits movement of fluid through the run-off tube to the plate below. The size and relationship of the gas shut-off device with its associated run-off tube is such that when the absorption column is first started up, the gas entering from the bottom of the column is prevented from traveling throughout the column by means of the various run-off tubes. In other words, the path through the run-off tubes and the associated gas shut-off device is blocked at start up.

By designing the absorption column as a countercurrent column, with the liquid moving from the head of the column to the sump thereof and the gas moving in the opposite direction, a higher average concentration difference between the gas and the liquid is obtained in comparison to the existing uni-directional type column.

The use of the porous, sintered material to form the column plates, increase the absorption and desorption characteristics of these columns in comparison to the conventional filling-material and plate columns which operate in the countercurrent modes.

The overall length of the column can be minimized if a plug of porous, sintered material having a plurality of parallel passage openings, similar to the column plates, is used at the bottom end of the run-off tube as the gas shut-off device. The combination of the pressure due to capillary action in the openings and the liquid in the tube above the plug prevent the gas from exiting the column through the run-off tubes.

BRIEF DESCRIPTION OF THE DRAWINGS

Reference is now made to the accompanying drawings for a better understanding of the nature and objects of the invention. The drawings illustrate the best modes presently contemplated for carrying out the objects of the invention and its principles, and are not to be construed as restrictions or limitations on its scope.

IN THE DRAWINGS

Figure 1:
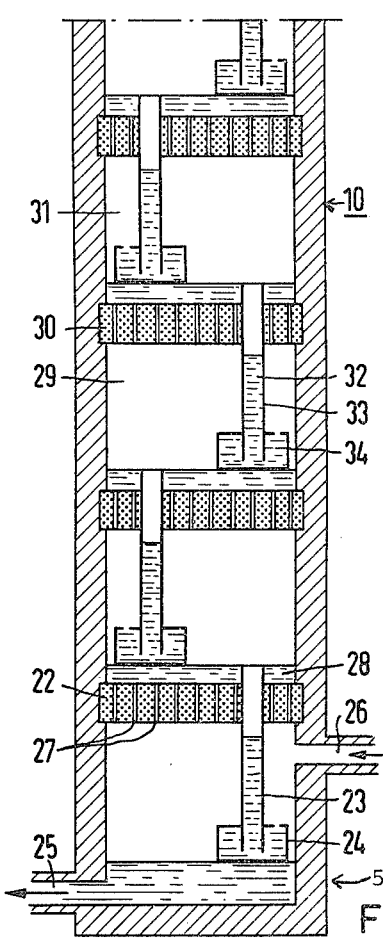

FIG. 1 is a sectional, elevation view of an embodiment of the present invention.

Figure 2:
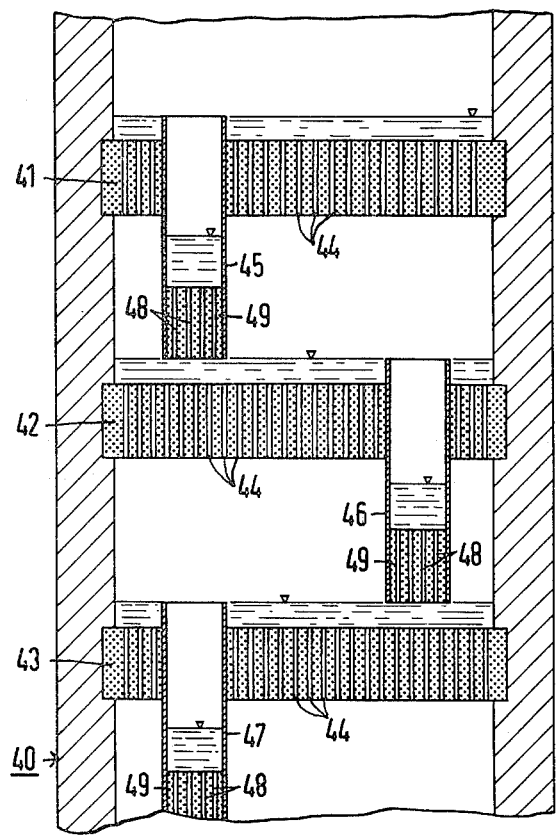

FIG. 2 is a partial elevation view of an alternate embodiment of the present invention.

Figure 3:
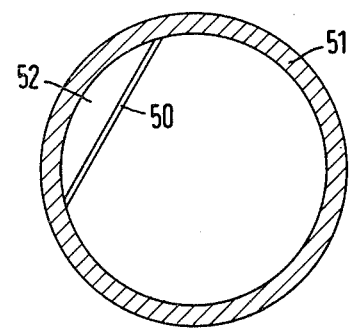

FIG. 3 is a sectional, plan view of a portion of the invention of still another embodiment.

DESCRIPTION OF THE PREFERRED EMBODIMENTS

Referring to FIG. 1, the column 10 according to this embodiment is comprised of a vertical housing which for the particular construction depicted, has an overall height of approximately 1 meter. The column includes a head or top end 55 which is connected to the source of liquid that is to be processed in the column by duct 12. Additionally, exit duct 35 carries the gas or vapor processed by the column away from the column. Located at the bottom or sump end 56 of the column is an intake duct 26 which is connected to the source of gas or vapor which will interface with the liquid in the column. Additionally, the sump end includes the liquid exit duct 25, which carries the processed liquid away from the column. Between the head and sump end of the column, housing walls 11, provide the necessary support for the column plates. The walls of the column are fabricated from a material which is chemically compatible with the particular gases and liquids which will be processed in the column.

Later on, the operation of the column will be described wherein the liquid solution introduced into the column through duct 12 is a carbon dioxide-charged basic alkazide solution i.e., an aqueous solution of an alkali salt of an amino acid, and the interacting vapor is superheated steam. For this liquid and gas combination, the head, walls and sump end of the column may be made from plexiglass or other suitable plastic material. A suitable steel alloy can be used where other reacting mediums are involved, and particularly in columns longer in length than one meter.

Spaced along the length of the column, in corresponding recesses in the walls 11 are a plurality of column plates 13, 20, 30, 22 etc. These plates are fabricated from a highly porous open-pore material such as sintered magnesium aluminum silicate. The porosity of the material for each column plate represents between 20 to 60% of the plate volume and preferably lies within the range of 40 to 45%. Typically, a particular plate such as 13 would have a thickness of approximately 13 mm and a plate diameter of 70 mm. Generally, the ratio of the plate thickness to the plate diameter is preferably greater than 0.1 although suitable operation of the column can be obtained for a ratio less than 0.1. However, in the latter situation, because of pressures involved it would be necessary to provide a reinforcing section beneath each column plate and particularly so where columns of larger diameter are used.

Each plate includes a plurality of parallel passage openings 15, 27, etc. running from the top of the plate through the material to the bottom. Each plate has approximately 40 such parallel holes per $cm^2$ cross-sectional area. The diameter of each passage opening generally ranges in the area of 0.5 mm to 5 mm, although a diameter of 1 mm has been found to be preferable. It has been found that for best operation of the invention, the ratio of the diameter of the passage openings to the thickness of the column plate lie in the range of 0.03 to 0.3. The volume porosity of the plates, considering the volume of the pores and the passage openings taken together, is preferably at least 60%.

As noted earlier, the column plates 13, 20 etc. are interspaced along the length of the column in corresponding recesses in the side walls 11 of the column thereby forming a plurality of spaces, 21, 31, 29, etc. The spacing between the plates for the embodiment shown are approximately 60 mm.

Associated with each column plate is a so-called run-off tube, such as 16, 33 and 23. These tubes are manufactured from a material similar to the column walls which, again, is selected based on its capatibility with the reaction gases and liquids. The tubes are fitted through a corresponding opening in each plate. The diameter of the tube runs approximately 20 mm with each tube having a length of about 60 mm. The tubes are pressed through each plate such that they extend about 15 mm above the associated column plate.

Positioned below each run-off tube, are containers such as 17, 34 and 24. Like the tubes and the side walls of the column, the material of the container is a function of the gases and liquids used in the reaction process. The container for the purposes of this embodiment may be circular in shape having a diameter of approximately 40 mm and a height of 20 mm. In general the top of the container is closed off except for the point where the run-off tube enters the container and for certain outlet openings 18, for example, which are necessary for reasons soon to become evident. The run-off tube, 16 for example, extends approximately 7 mm into the container 17. The outlet opening 18, which appears in FIG. I as a single opening can be, in fact, a plurality of openings for any given container. The ratio of the cross-sectional area of the openings for a given container to the cross sectional area of the run-off tube is less than 1.

Consider now how column 10 effects the purposes of the invention where the liquid introduced by duct 12 is an solution, charged by carbon dioxide and the vapor introduced at the bottom end of the column 10 via duct 26, is superheated steam. The liquid solution enters the column head 55 and forms a layer 14 on the top of the uppermost plate 13. The liquid penetrates into the pores of the column plate 13 and enters the passage openings 15 from the top and through the pores of the side walls of the openings. When the level of the fluid on top of column plate 13 rises above the top end of run-off tube 16, the liquid flows into the tube 16, into the container 17 out of the outlet opening 18 on to the top of column plate 20 thereby forming a liquid layer 19 on plate 20. The liquid continues flowing down through the column plates until the sump end is reached where it exits from the column via duct 25. The superheated steam is introduced to the pump through the duct 26. At startup, if it is desirous that the interaction between the steam and the liquid take place almost immediately, a shut-off valve, not shown, can be placed in the line 25 to preclude venting of the steam through that duct. Once the liquid has begun to fill the bottom of the column, the fluid level rises above the exit opening to duct 25 thereby forming its own "shut-off" valve.

As explained earlier the liquid penetrates each column plate due to the hydrostatic pressure of the corresponding level but more particularly due to the capillary forces. The liquid is retained by the pores and passage openings by this same capillary force resulting in the plate being completely filled with liquid. A similar situation occurs with each of the column plates along the length of the housing.

Assuming that the liquid in the housing achieved a steady state, that is, the various levels have been established on each of the particular column plates, the gas entering the space 21 beneath column plate 13 has already been enriched by the carbon dioxide it has desorbed from its reaction with the liquid solution at each of the lower column plates. Once the gas has entered the space 21 it is precluded, for reasons hereinafter disclosed, from entering the space above plate 13, through the container 17 and run-off tube 16. It is forced to pass to the space above the plate by entering the passage openings 15. It can only pass through these passage openings if the pressure in space 21 is sufficient to overcome the capillary forces in the passage openings and the hydrostatic pressure of the liquid level 14. For a plate thickness of 13 mm, the over-pressure requirement in space 21 is on the order of 300 $N/m^2$. With this kind of pressure head, the steam enters the individual passage openings contacting the liquid that is contained therein and which is held by the pores of the opening walls. The gas presses through the openings and comes into further contact with the liquid as it permeates through the layer 14. This intensive mixing between the gas and liquid both in the passage holes and in the level 14, results in a comparatively high absorption of the carbon dioxide by the superheated steam.

The fact that the exchange between the liquid and gas takes place mainly in the column plates, where the amount of fluid remains relatively constant in spite of column movements minimizes the motion sensitivity of the column.

The particular design of the plates brings about a uniform pressure-loss of the gas through each layer. Thus the gas flows through the column with a relatively constant velocity which makes the column virtually insensitive to the load of the column and load fluctuations. Because of this load insensitivity, the column described can have a smaller cross-sectional area than conventional filled-material or plate-type columns for a given liquid throughput.

As noted earlier, the ratio of the diameter of the passage openings 15 to the thickness of a given plate should lie, for best results, in the range of 0.03 to 0.3. With passage openings that are too narrow or too long, large pressure losses, caused by excessive capillary forces occur. In the case where the passage openings are too wide and too short, the reduced amount of contact between the flowing gas and the liquid in the porous plate would significantly reduce the high exchange rate between the two. So, too, the ratio of the column plate thickness to the plate diameter is greater than 0.1 to ensure sufficient carrying capacity of the column plates necessary for a maximum exchange between the two mediums.

The gas in travelling from the space below a given plate to the space above, can make the transition only by travelling through the given column plate, assuming the device has reached its steady state condition in which the liquid levels are established on all of the plates in the column. In order to prevent the gas from passing from one space to the space above via the container such as 18 and run-off tube 16, these latter two, together with the liquid therein act as a suitable gas shut-off device. The particular structure of the material of the column plates and the particulars with regard to the dimensions of the plate and the parallel openings, determine the pressure-loss of the gas as it passes through the plate. This pressure-loss controls the height of the run-off tubes and the particular design and dimensions of the overall gas shut-off device. The additional pressure-loss through the liquid level above a given plate must also be considered in the design of the shut-off device.

The capillary forces due to the liquid saturated column plate and the liquid level above the plate require that a certain pressure below a given column plate be established before the gas will permeate through the plate above. As noted earlier this pressure would be on the order of 300 $N/m^2$. In order to prevent the gas from passing through the container and run-off tube, sufficient fluid must be contained in the combination of these two such that when the fluid rises to a level in the tube in response to the gas pressure in the space the hydrostatic pressure exerted by the level of fluid in the tube in sufficient to counterbalance the effect of the gas pressure. Utilizing the design dimensions above for the run-off tube and container, and a pressure of 300 $N/m^2$, the liquid will rise only part way up the tube. The remaining section of the run-off tube serves to compensate for any pressure losses which may occur, due to friction, when the liquid runs down and further provides a safety margin which allows the column to operate in an overload condition caused by an increased through-out of liquid. Pressure fluctuations of the gas can be equalized by corresponding movement of the liquid column in the run-off tube.

By making the other openings of the container 17, i.e. the ratio of the total area of all the outlet openings 18 of the container 17 to the cross-sectional area of the run-off tube less than one as noted earlier, fluctuations of the column in the run-off tube due to any suction effect caused by the liquid flowing out of the outlet opening 18, can be largely minimized.

The close contact between the liquid and the gas takes place at each of the column plates. As the solution moves from plate to plate its carbon dioxide concentration, absorbed in part by the steam co-acting with the liquid in a given plate, decreases. At the lower plate level, pure steam comes into contact with the already depleted solution and still further desorption occurs such that the solution as it leaves the column via duct 25 is almost completely depleted of carbon dioxide. After passing through all of the column plates and the final liquid layer 14, the carbon dioxide enriched steam leaves the column via the exit duct 35.

As an illustration of the capability of the column just described, for a solution of 20 liters/hour entering the column at duct 12 and for a column having 12 plates, it was possible to reduce the carbon dioxide content of the solution from 37 liters per liter of solution to 9.4 liters per liter of solution.

FIG. 2 represents an alternate embodiment to the column described in FIG. 1. Particularly, the column 40 differs from column 10 in the manner in which the gas shut-off device is implemented. The column plates, 41, 42 and 43, etc. are fabricated from the same, highly porous, sintered material and have the same dimensional characteristics as the plates associated with column 10. Likewise run-off tubes 45, 46, 47, etc. penetrate or pass through a corresponding column plate but instead of having their bottom end positioned within a retainer or container portion 17, the tubes have a plug 49 of highly porous, sintered material similar to the material comprising the column plates, positioned at the bottom thereof. The plugs include the parallel openings 48 which have the same diameter and run-off openings per $cm^2$ as those in the column plates. The diameter of the plugs correspond to the inside diameter of the run-off tubes, and are on the order of 30mm. Whereas the height of the liquid column in the run-off tubes associated with the column of FIG. 1 precluded the gas from passing therethrough, in the embodiment of FIG. 2, the combination of the liquid in the passage openings 48 of the plug 49 and the hydrostatic pressure of the liquid column above the plug provide the pressure necessary to prevent the superheated steam from entering the run-off tube. Because of the greater pressure effect due to the capillary action within the plug 49, the length of the run-off tubes can be reduced significantly. A suitable length was found to be 35mm with the tube extending about 5mm above the corresponding column plate. Since the distance between column plates can now be reduced, in fact to about 25 to 30mm as compared to 60mm in the first embodiment, the configuration of FIG. 2 results in a significant reduction in the structural height of the column.

Since the plug 49 has the same characteristics as the plate 41, it is sufficient, to block the steam, if the same level of liquid stands in the run-off tube as the level of the liquid above the column plate. The thickness of the plug 49 is typically somewhat larger than that of the column plate and the level of liquid in the tube is somewhat greater than the level above the plate. This is to insure reliable operation.

FIG. 3 shows in schematic form how the run-off tube can be implemented by utilizing a segment of the column wall to help form a particular tube. As shown the column is of circular cross section having a wall 51. A partition 50 is embedded in corresponding recesses in the wall 51 thereby forming a segmented space 52 which serves as the run-off tube. The partition 50 will extend above the corresponding column plate with the gas shut-off device arranged at the lower end of the partition. The shut-off device may be the combination of a container and tube shown in FIG. 1 or might be the improved embodiment of FIG. 2 wherein the plug of sintered material is inserted at the bottom end of the partition between the partition and the column wall. In a typical application, the partition 50 would be embedded in the walls 51 of the column such that the curved portion of the segment formed has a length of 20mm for a plate diameter of 70mm.

Although the column has been described in a basic desorption process, it is also to be noted that the column according to the invention also provides similarly good results when used as an absorption column. It has applications in such technical processes as a countercurrent scrubber as well as a distillation column. Further, it has application for the decomposition of chemical compounds such as hydrogen peroxide provided the column plates are provided with suitable decomposition catalysts by an appropriate treatment.

It is to be appreciated that changes in the above embodiments can be made without departing from the scope of the present invention. Other variations of the specific instruction disclosed above can be made by those skilled in the art without departing from the invention as defined in the appended claims.

What is claimed is:

1. An apparatus for facilitating absorption of gases or vapors by a liquid or desorption of gases or vapors from a liquid which comprises:
   a. a column housing;
   b. a plurality of plates having a predetermined thickness and a cross-sectional area, fabricated from a porous, sintered material, each of said plates having a plurality of parallel passage openings of predetermined cross-sectional area, therethrough said plates positioned horizontally within said column at a predetermined distance from each other;
   c. means for introducing said liquid at the head of said column;
   d. means for introducing said gases or vapors at the sump end of said column;
   e. a plurality of run-off means communicating between the space above and below each plate, said run-off means carrying a portion of said liquid from the top of one of said plates to said space below, each of said run-off means being comprised of a tube having a predetermined height and diameter such that the portion of the liquid in a given tube exerts a greater pressure on the gas below a corresponding plate than corresponds to the difference between the gas pressure above and below said corresponding plate, with said height being such that the liquid column in a given tube can adjust itself to compensate for variations in gas pressure difference between above and below a corresponding plate; and
   f. a plurality of gas shut-off means cooperating with the portions of a corresponding one of said run-off means located in the space below in a corresponding plate, each gas shut-off means including a porous, sintered material having a plurality of parallel passage openings of predetermined cross-sectional area therethrough, said latter material positioned in a corresponding tube such that the sum of the capillary pressure of the liquid in the latter passage openings and the hydrostatic pressure of the liquid column in the tube above it exert said greater pressure on the gas below the corresponding plate to thereby prevent said gases or vapors from passing from the space below said corresponding plate to the space above through a given gas shut-off means and its corresponding run-off means.

2. The apparatus of claim 1 wherein each of said tubes is formed by a partition imbedded in the wall of said housing.

3. The apparatus of claim 1 wherein the ratio of the diameter of said passage openings to the thickness of said plates is between 0.03 and 0.3.

4. The apparatus according to claim 1 wherein the ratio of the thickness of said plates to the diameter of said plates is greater than 0.1.

5. The apparatus of claim 1 wherein said sintered material in each of said tubes has about 40 passage openings per square centimeter with each passage opening having a diameter of about 1 mm.

* * * * *